United States Patent
Nishijima et al.

(10) Patent No.: US 9,623,467 B2
(45) Date of Patent: Apr. 18, 2017

(54) FORM ROLLING METHOD FOR JOINT PORTION OF FLUID SUPPLY PIPE AND FLUID SUPPLY PIPE

(71) Applicant: NISSHIN STEEL CO., LTD., Chiyoda-ku, Tokyo (JP)

(72) Inventors: Shinnosuke Nishijima, Tokyo (JP); Katsuhide Nishio, Tokyo (JP); Akihiro Ando, Tokyo (JP); Kouki Tomimura, Tokyo (JP)

(73) Assignee: NISSHIN STEEL CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/036,933

(22) PCT Filed: Nov. 17, 2014

(86) PCT No.: PCT/JP2014/080379
§ 371 (c)(1),
(2) Date: May 16, 2016

(87) PCT Pub. No.: WO2015/072571
PCT Pub. Date: May 21, 2015

(65) Prior Publication Data
US 2016/0288187 A1    Oct. 6, 2016

(30) Foreign Application Priority Data

Nov. 18, 2013  (JP) .................................. 2013-237514
Nov. 14, 2014  (JP) .................................. 2014-232025

(51) Int. Cl.
*B21D 17/04*    (2006.01)
*F16L 23/04*    (2006.01)
(Continued)

(52) U.S. Cl.
CPC ............. *B21D 17/04* (2013.01); *B21H 7/182* (2013.01); *F16L 17/04* (2013.01); *F16L 23/04* (2013.01)

(58) Field of Classification Search
CPC .......... B21D 17/04; F16L 17/04; F16L 23/04; B21H 7/182
(Continued)

(56) References Cited

U.S. PATENT DOCUMENTS 3,995,466 A * 12/1976 Kunsman ............... B21D 17/04
                                                    72/105
6,196,039 B1 * 3/2001 Williams ............... B21D 17/04
                                                    72/105
(Continued)

FOREIGN PATENT DOCUMENTS

JP    56027316 A    3/1981
JP    S56-163886 U  12/1981
(Continued)

OTHER PUBLICATIONS

International Search Report corresponding to Application No. PCT/US2014/080379; Date of Mailing: Jan. 20, 2015, with English Translation.

*Primary Examiner* — David B Jones
(74) *Attorney, Agent, or Firm* — Cantor Colburn LLP

(57) ABSTRACT

Provided is a method of forming a locking ridge for a case of forming the locking ridge on an outer peripheral surface of a joint portion by form rolling, the method realizing a joint portion structure which is superior in pipe detachment prevention performance when pipes with locking ridges are connected by fixing pipe ends with a housing. Using a convex roller arranged inside the workpiece pipe body and a forming circular groove arranged outside the pipe body, the locking ridge is form-rolled such that an upright wall portion thereof is raised at an angle of at least 65° and no (Continued)

$(W_U - W_I)/2 <$ WORKPIECE PIPE BODY PLATE THICKNESS greater than 90° with respect to the outer peripheral surface in the pipe axis direction, and that a height of the locking ridge from the outer peripheral surface to the apex of the tip portion is at least a total of curvature radii of faces of the processing means in contact with the pipe body.

4 Claims, 8 Drawing Sheets

(51) Int. Cl.
*B21H 7/18* (2006.01)
*F16L 17/04* (2006.01)
(58) Field of Classification Search
USPC .......................................................... 72/105
See application file for complete search history.

(56) References Cited

U.S. PATENT DOCUMENTS

| 8,777,277 | B2 * | 7/2014 | Dole | ...................... B21D 41/00 285/365 |
|---|---|---|---|---|
| 2002/0066298 | A1 | 6/2002 | Iura et al. | |

FOREIGN PATENT DOCUMENTS

| JP | H03094927 A | 4/1991 |
|---|---|---|
| JP | H09196257 A | 7/1997 |
| JP | 2000237832 A | 9/2000 |
| JP | 2007078052 A | 3/2007 |
| JP | 4774325 B2 | 10/2007 |
| JP | 2009274128 A | 11/2009 |
| JP | 3171690 U | 10/2011 |

* cited by examiner

FIG. 1

$(W_U - W_I)/2 <$ WORKPIECE PIPE BODY PLATE THICKNESS

FIG. 2

($W_U$−$W_I$)/2 ≥ WORKPIECE PIPE BODY PLATE THICKNESS

FIG. 3

FORMATION OF VERTICAL UPRIGHT WALL BY LATERAL
MOVEMENT OF FORMING CIRCULAR GROOVE 12

($R_I$+$R_U$) < CONVEX HEIGHT

FIG. 13A — COMPONENT FORCE OF FORCE APPLIED TO LOCKING RIDGE

FIG. 13B — DEFORMATION BEHAVIOR OF LOCKING RIDGE UPON DETACHMENT

FORM ROLLING METHOD FOR JOINT PORTION OF FLUID SUPPLY PIPE AND FLUID SUPPLY PIPE

This is the U.S. national stage of application No. PCT/JP2014/080379 filed on Nov. 17, 2014. Priority under 35 U.S.C. §119(a) and 35 U.S.C. §365(b) is claimed from Japanese Application No. 2013-237514, filed Nov. 18, 2013 and Japanese Application No. 2014-232025, filed Nov. 14, 2014, the disclosures of which are also incorporated herein by reference.

TECHNICAL FIELD

The present invention relates to a form rolling method for a joint portion of a connectable water supplying pipe provided in a building etc. for fire extinction, and of a fluid supply pipe for water and sewage.

BACKGROUND ART

A connectable water supplying pipe provided in a building etc. for fire extinction, and a fluid supply pipe for water and sewage are installed by connecting pipe bodies of a predetermined length by housing type pipe joints.

Figure 9:
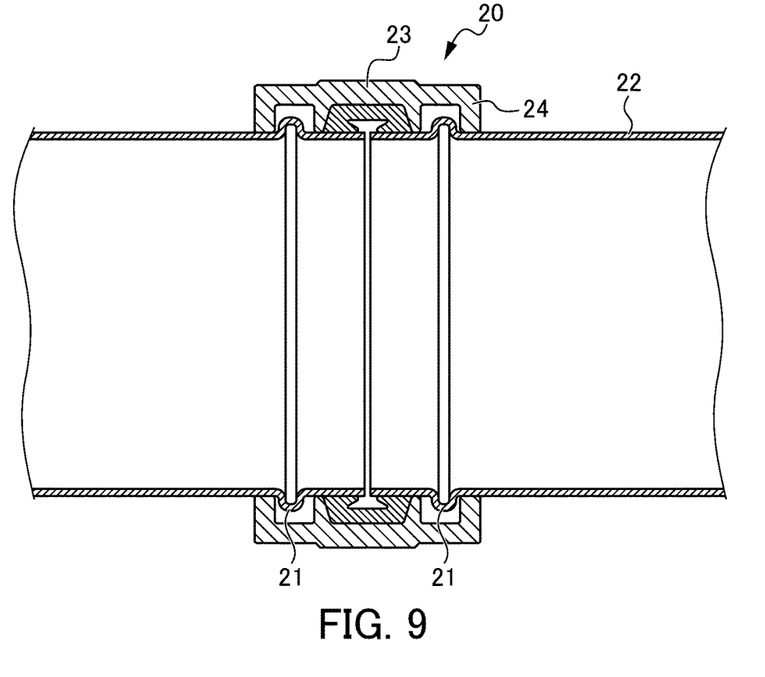
FIG. 9 is a diagram illustrating a housing-type pipe joint structure employing a common locking ridge.

For the housing type pipe joints, as a structure for avoiding detachment of a pipe body 22 from a housing 23 in a housing type pipe joint 20, a structure as illustrated in FIG. 9 in which a circular locking ridge 21 is formed on an outer peripheral surface of an end portion of the pipe body 22, the locking ridge 21 being engaged with an inner peripheral opening edge 24 of the housing 23 has been proposed (Patent Document 1).

Figure 10:
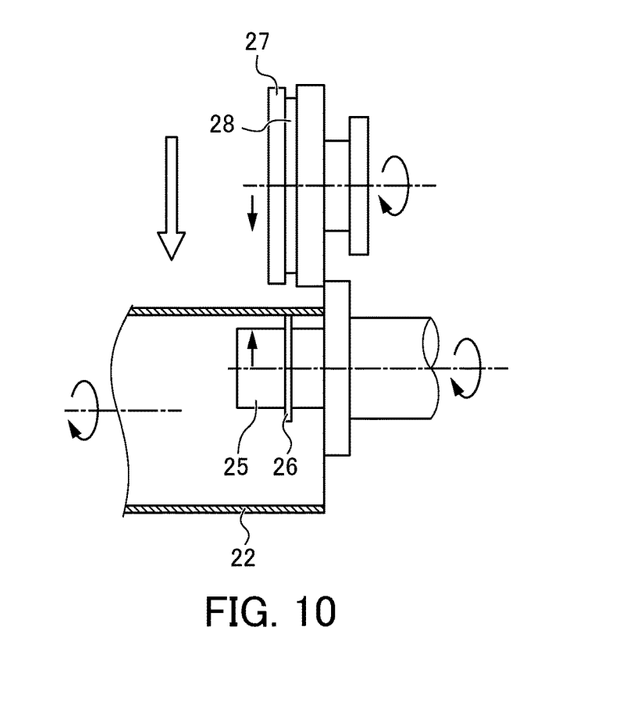
FIG. 10 is a diagram illustrating a method of forming a locking ridge by a common form rolling method.

In addition, as illustrated in FIG. 10, Patent Document 1 also discloses, as a method of forming the locking ridge on the outer peripheral surface of the end portion of the pipe body, form rolling to form the locking ridge on the outer peripheral surface of the end portion of the pipe body by rotating in a circumferential direction of a workpiece pipe body 22 while pressurizing in directions of approaching each other an inner convex roller 25 having a forming ridge 26 arranged inside the workpiece pipe body 22 and an outer concave roller 27 having a forming circular groove 28 arranged outside the workpiece pipe body 22.

Figure 11:
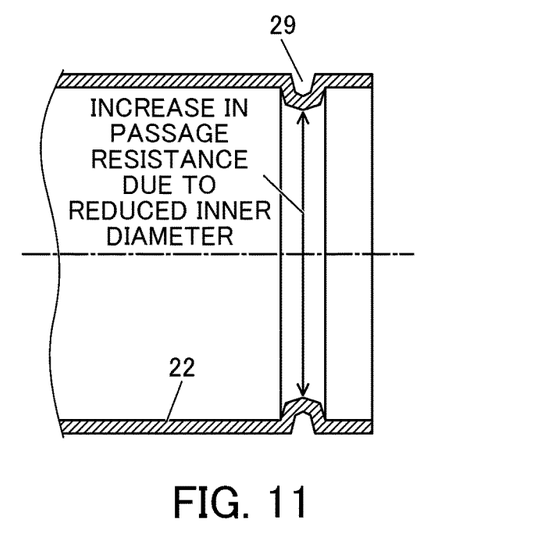
FIG. 11 is a diagram illustrating a structure in which a circular groove is formed on an outer peripheral surface of a pipe body.
Figure 12:
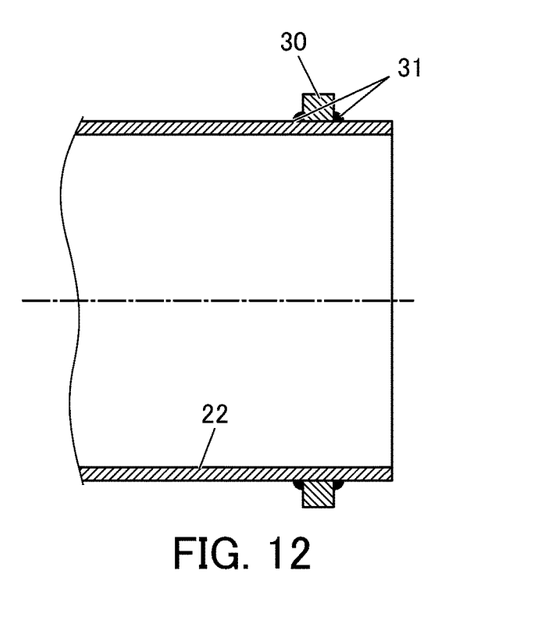
FIG. 12 is a diagram illustrating a structure in which a circular locking member is welded onto an outer peripheral surface of a pipe body.

Alternatively, as illustrated in FIG. 11, a joint structure for a fluid supply pipe having a circular groove 29 formed on an inner peripheral surface of a pipe body has been proposed (Patent Document 2). The joint structure for a fluid supply pipe proposed in Patent Document 1 employing a locking ridge formed on the outer peripheral surface of the pipe body by a form rolling method is free from risk of increased passage resistance due to reduced inner diameter of the pipe body, compared to the joint structure proposed in Patent Document 2. Yet alternatively, as illustrated in FIG. 12, Patent Document 3 proposes a matter in which a circular locking member 30, which is a separate part from a pipe body, is bonded onto an outer peripheral surface of the pipe body by means of a welded portion 31. However, in the case of bonding a separate part onto a supply pipe by welding, spatters attached onto the supply pipe after the welding may cause liquid leakage and damage of a sealing member, and welding quality control is therefore required. Meanwhile, the joint structure for a fluid supply pipe proposed in Patent Document 1 employing the locking ridge formed on the outer peripheral surface of the pipe body by the form rolling method allows easier formation of the locking ridge and is advantageous from a cost perspective, since such structure does not require a separate part and the locking ridge can be formed by simply form rolling an end of the workpiece pipe body.

Patent Document 1: Japanese Unexamined Patent Application Publication No. 2007-78052
Patent Document 2: Japanese Registered Patent No. 4774325
Patent Document 3: Japanese Registered Utility Model No. 3171690

DISCLOSURE OF THE INVENTION

Problems to be Solved by the Invention

Incidentally, a measure called "water vision" aimed at construction of safe lifelines against major earthquake and reduction of environmental load is being developed in recent years, consequently a need for a water pipe that is superior in reliability, environmental friendliness, durability, and lifecycle cost efficiency is rising. As a water pipe that is superior in reliability and durability, there is an increasing demand for a joint structure that is superior in pipe detachment prevention performance for preventing a pipe from slipping off from a pipe joint.

Given such a demand, the locking ridge formed by the method proposed in Patent Document 1 is not necessarily superior in pipe detachment prevention performance.

In the case of the locking ridge being formed on the outer peripheral surface by the form rolling method disclosed in Patent Document 1, a cross-sectional shape of the locking ridge is raised from a basal portion continued from the outer peripheral surface of the pipe body, forms a tip portion and then descends, and continues to the outer peripheral surface of the pipe body.

Figure 13A:
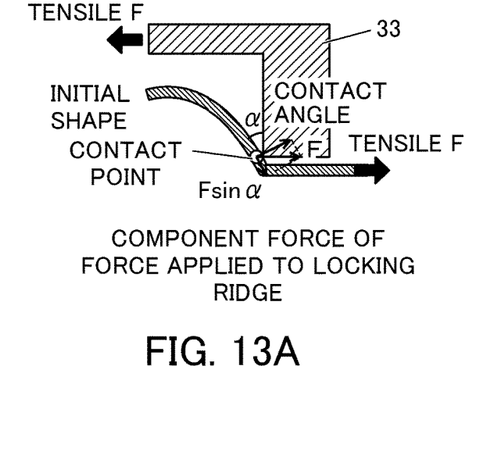
FIG. 13 is a diagram illustrating a defective state of a joint portion employing a common locking ridge.
Figure 13B:
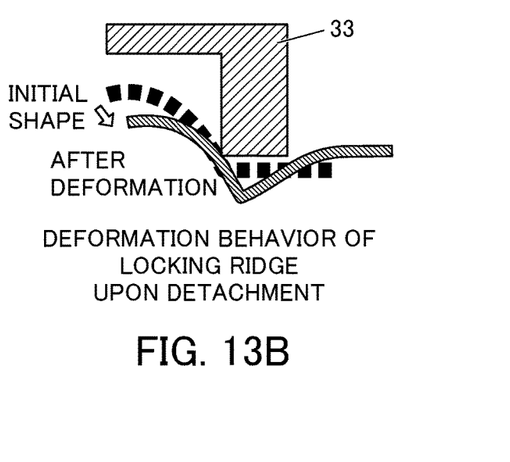

As illustrated in FIG. 9, the fluid supply tube having the joint portion with a locking ridge of such a cross-sectional shape being formed is fixed in combination with a housing. Faces of the housing in contact with the locking ridge are generally substantially angular. When the locking ridges of two joint portions are fixed by the housing and a tensile load in a pipe axis direction is applied thereto, a contact relationship between the housing and the locking ridges is almost line contact. A load (surface pressure) per unit area applied to contact surfaces of the locking ridges is high and triggers deformation of the locking ridges. This deformation may make the locking ridge be in surface contact with the housing. However, as illustrated in FIG. 13(a), since the abovementioned contact relationship has a contact angle α, the tensile load F being applied also generates a component force F·sin α downward along a pipe wall, in addition to a force in a pipe axis direction. Such a downward component force generates a force by which the housing presses the locking ridge into the pipe. If the locking ridge is as deformable as the pipe body, the locking ridge is likely to deform along with the pipe body as illustrated in FIG. 13(b). In addition, a reaction force against the force generated downward expands the housing in an outer diameter direction, further increasing likelihood of pipe detachment. A drop prevention force at the joint portion, i.e., the pipe detachment prevention performance, is therefore supposed to be reduced.

The present invention has been conceived in order to solve such problems and is related to a method of forming a locking ridge on an outer periphery of a joint portion of a fluid supply pipe by a form rolling method. An objective is to provide a method of forming such a locking ridge that a joint portion structure which is superior in pipe detachment prevention performance can be obtained when pipes with the locking ridges formed by said form rolling method are connected by fixing pipe ends with a housing. Another objective is to provide a fluid supply pipe which is provided with the above described joint portion structure and is superior in pipe detachment prevention performance.

Means for Solving the Problems

In order to achieve the objectives, the present invention is a form rolling method of a joint portion of a fluid supply pipe, the form rolling method forming a locking ridge having an upright wall portion on an outer peripheral surface of a workpiece pipe body, characterized in that: the locking ridge includes a curved basal portion extending from the outer peripheral surface, the upright wall portion extending from the basal portion, a curved portion extending from the upright wall portion, and a tip portion extending from the curved portion; and the locking ridge is formed by a processing means arranged inside and outside the pipe body such that the upright wall portion is raised at an angle of at least 65° and no greater than 90° with respect to the outer peripheral surface in a pipe axis direction and a height of the locking ridge from the outer peripheral surface to an apex of the tip portion is at least equal to a total of curvature radii of faces of the processing means arranged inside and outside in contact with the pipe body.

Figure 1:
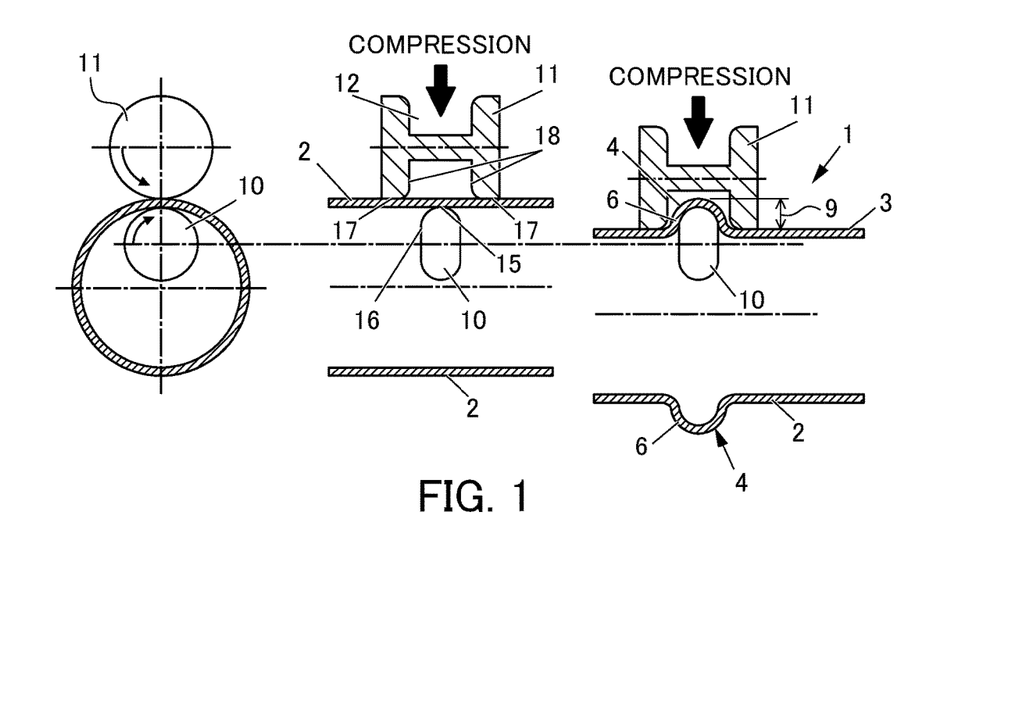
FIG. 1 is a diagram illustrating a method of forming the locking ridge by using the convex roller and the forming circular groove, regarding the form rolling method of the present invention.

As illustrated in FIG. 1, a locking ridge 4 with an upright wall portion 6 is formed on an outer peripheral surface 3 of the pipe body, preferably by using a convex roller 10 arranged inside the workpiece pipe body 2 and a concave roller 11 with a forming circular groove 12 arranged outside a pipe body 2 as a processing means for forming a joint portion 1 of a fluid supply pipe.

Figure 2:
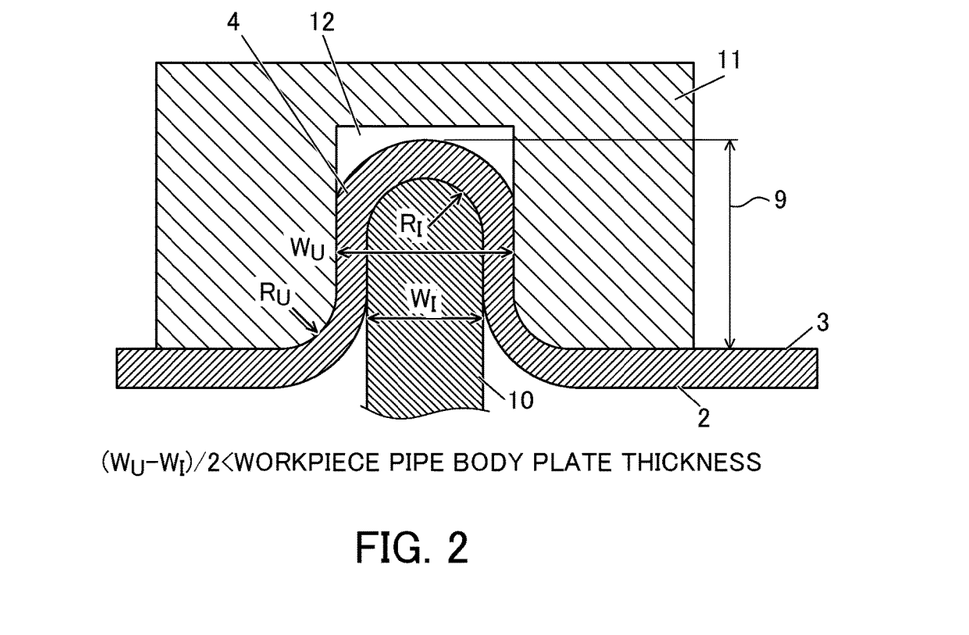
FIG. 2 is a diagram illustrating a relationship between the convex roller and the forming circular groove in the case of using a processing means having a clearance between the convex roller and the forming circular groove that is smaller than a plate thickness of the workpiece pipe body, regarding the form rolling method of the present invention.

As illustrated in FIG. 2, the processing means 10, 11 arranged inside and outside the pipe body 2 have predetermined curvature radii $R_T$ and $R_U$ on faces in contact with the pipe body. By performing the form rolling on the outer peripheral surface 3 of the pipe body such that a convex shape having a convex height 9, which is at least equal to a total of the curvature radii, is obtained, the upright wall portion 6 that is raised at a predetermined angle with respect to the outer peripheral surface 3 in the pipe axis direction can be formed. As illustrated in FIG. 6, the locking ridge 4 having been subjected to the form rolling has a shape with: a curved basal portion 5 extending from the outer peripheral surface 3 of the pipe body 2, the upright wall portion 6 extending from the basal portion 5, a curved portion 7 extending from the upright wall portion 6, and a tip portion 8 extending from the curved portion 7. The upright wall portion 6 has a shape that is raised at a predetermined angle with respect to the outer peripheral surface 3 in the pipe axis direction. The locking ridge 4 exerts a locking effect in a state in which mainly the upright wall portion 6 is in contact with the housing. Here, as illustrated in FIG. 2, the convex height indicates a height from the outer peripheral surface 3 of the workpiece pipe body 2 to a point of the tip portion 8 of the locking ridge 4. In the case of the convex height being smaller than the curvature radii, the convex shape formed in the locking ridge by form rolling is composed mainly of the basal portion 5 and the curved portion 7 continuing to the tip portion 8, with a small proportion of the upright wall portion 6.

The locking effect is therefore insufficient. On the contrary, the convex height that is too large is not preferable, since the decrease rate of plate thickness is large and the plate thickness reduces in the locking ridge. Such a tendency is particularly remarkable in the basal portion. As a result, the locking ridge has a reduced deformation resistance against the tensile load, and easily deforms.

Figure 6A:
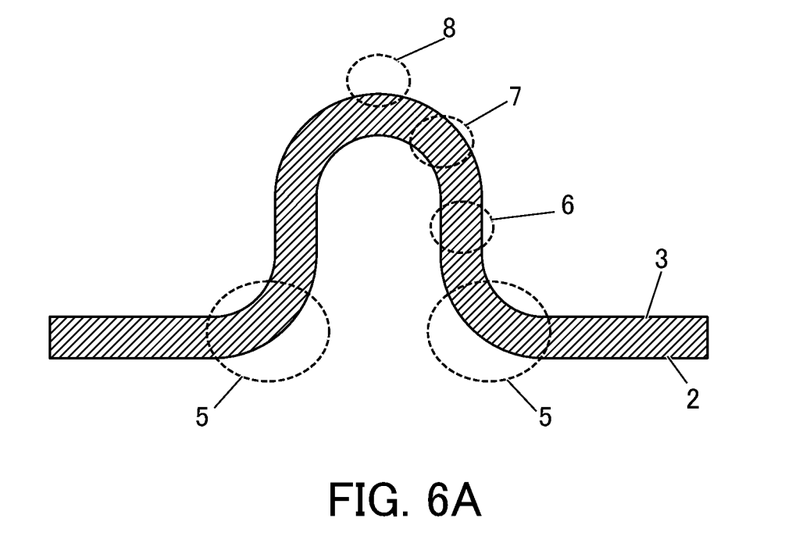
FIG. 6 is a diagram illustrating a locking ridge having an upright wall portion raised at a predetermined angle with respect to an outer peripheral surface of the pipe body, formed according to the form rolling method of the present invention.
Figure 6B:
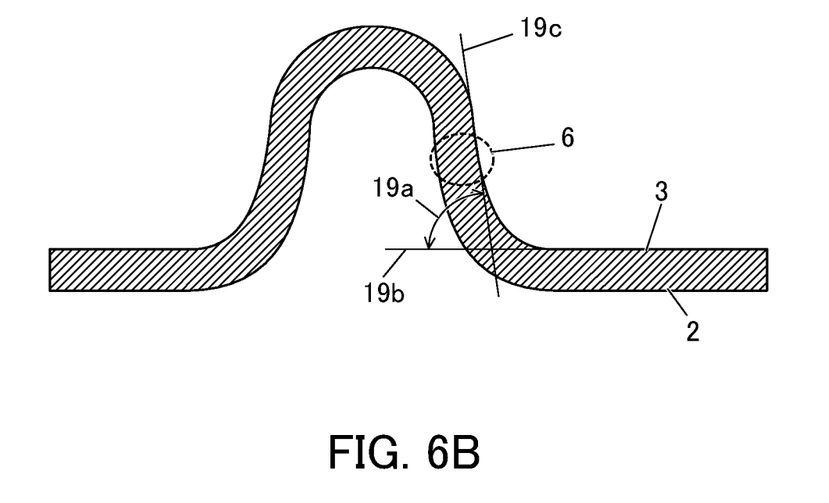

The angle at which the upright wall portion is raised is preferably in a range of 65° to 90°. The angle refers to, in a cross-sectional view of the joint portion of the pipe as illustrated in FIG. 6(b), in an intersection between a baseline 19b extended from the outer peripheral surface 3 of the pipe body 2 and a straight line 19c extended from an outer surface of the upright wall portion 6, an angle 19a between the baseline from the outer peripheral surface extending toward the inside of the locking ridge and the straight line from the upright wall portion. FIG. 6(a) shows an example of the upright wall portion 6 extending vertically at 90° with respect to the outer peripheral surface 3. FIG. 6(b) shows an example of extending at an angle smaller than 90°.

In the case of the upright wall portion formed at an angle of at least 65°, a high degree of work is applied and sufficient work-hardening is realized during formation, and the locking ridge is provided with greater hardness than that of a main part of the pipe body. When the joint portion fixed to the housing is used, a tensile load is applied in the pipe axis direction and the locking ridge is deformed to be in surface contact with the housing, thereby reducing surface pressure. In addition, the locking ridge, which has greater hardness than the pipe body, is less likely to deform than the pipe body and is resistant to a downward force from the housing pressing the locking ridge into the pipe. If the angle is greater, the proportion of a downward component force applied from the housing is reduced. The detachment prevention performance of the pipe against the tensile load is therefore improved. On the contrary, if the angle is small, the locking ridge has reduced hardness and deforms as easily as the pipe body under the downward force from the housing applied to the locking ridge, and the detachment prevention performance of the pipe is thus reduced.

Given the above, the angle is preferably at least 65°, more preferably at least 70°, or at least 80°. A greater angle is more preferable, since the downward component force from the housing is reduced. Particularly the locking ridge having the upright wall portion being raised vertically, such as one having an angle of 90°, is given a high degree of work and has great hardness. Such a locking ridge is preferable also for securing a surface contact state with the housing.

The locking ridge formed by the form rolling method of the present invention preferably has at least approx. 1.2 times hardness of a material of the pipe body. At least 1.5 times hardness and at least twice hardness are more preferable.

In the case of using a processing means having a clearance between the convex roller and the forming circular groove that is smaller than a plate thickness of the workpiece pipe body, the present invention can form a locking ridge of which upright wall portion extends vertically with respect to the outer peripheral surface, by processing the pipe body. More specifically, as illustrated in FIG. 2, it is preferable to process the workpiece pipe body 2 by operating the convex roller 10 and the concave roller 11 having the forming circular groove 12 in a direction approaching each other, while rotating along a circumferential direction of the outer peripheral surface 3 of the workpiece pipe body 2. The pipe body 2 is compressed by the convex roller 10 and the forming circular groove 12, and deforms in such a way that the plate thickness is reduced, to thereby form the locking ridge having the upright wall portion 6 raised vertically with respect to the outer peripheral surface 3 in the pipe axis direction. In the locking ridge 4, a high degree of work is applied and hardness is increased by work-hardening.

Figure 3:
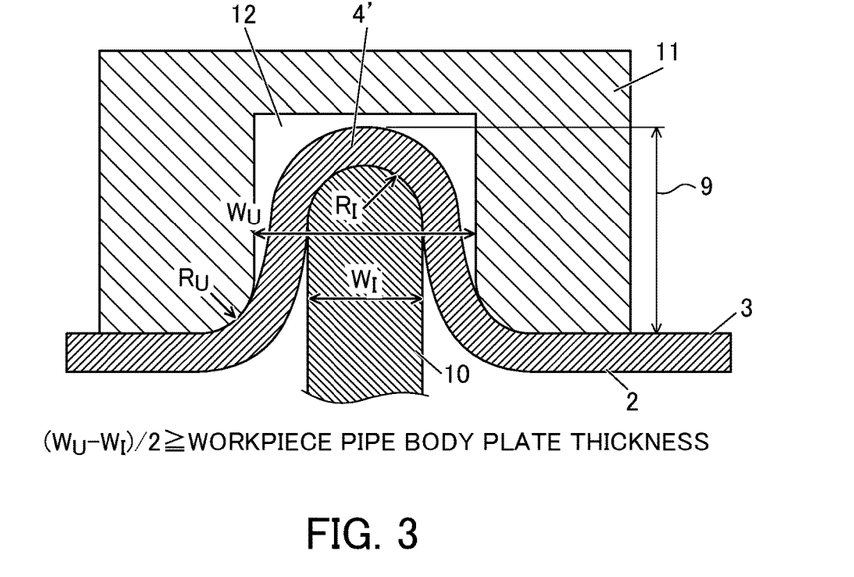
FIG. 3 is a diagram illustrating a method of forming the locking ridge by using a processing means having a clearance between the convex roller and the forming circular groove that is greater than a plate thickness of the workpiece pipe body, regarding the form rolling method of the present invention.
Figure 4:
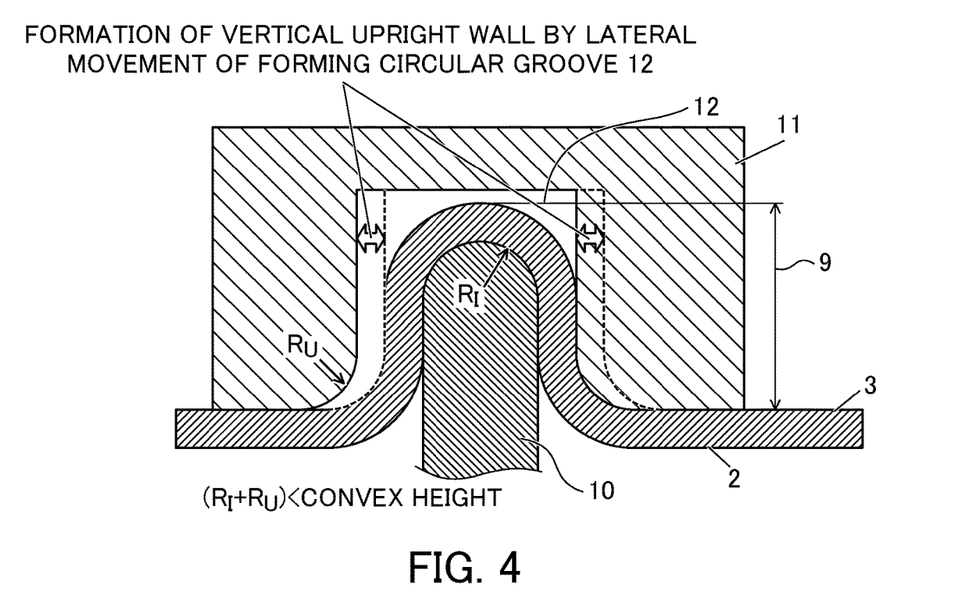
FIG. 4 is a diagram illustrating a method of forming an upright wall portion in the convex portion being formed, by using a processing means having a clearance between the convex roller and the forming circular groove that is greater than a plate thickness of the workpiece pipe body, regarding the form rolling method of the present invention.

Alternatively, as illustrated in FIG. 3, in the case of using a processing means having a clearance between the convex roller 10 and the forming circular groove 12 that is greater than a plate thickness of the workpiece pipe body, a convex portion (overhanging portion) 4' can be formed on the outer peripheral surface and can be used as the locking ridge 4. If an angle of the upright wall portion of the convex portion is too small, a locking ridge having a greater angle can be then formed by moving the forming circular groove 12 in a pipe axis direction of the workpiece pipe body 2 as illustrated in FIG. 4 to press the convex portion against the convex roller 10.

In order to form the upright wall portion according to the present invention, the convex portion must be formed such that a height of the convex portion is at least equal to a total of $R_I$ at a tip of the convex roller arranged inside and $R_U$ at a contact portion between a tip surface of the forming circular groove arranged outside and an inner upright wall surface.

Figure 5:
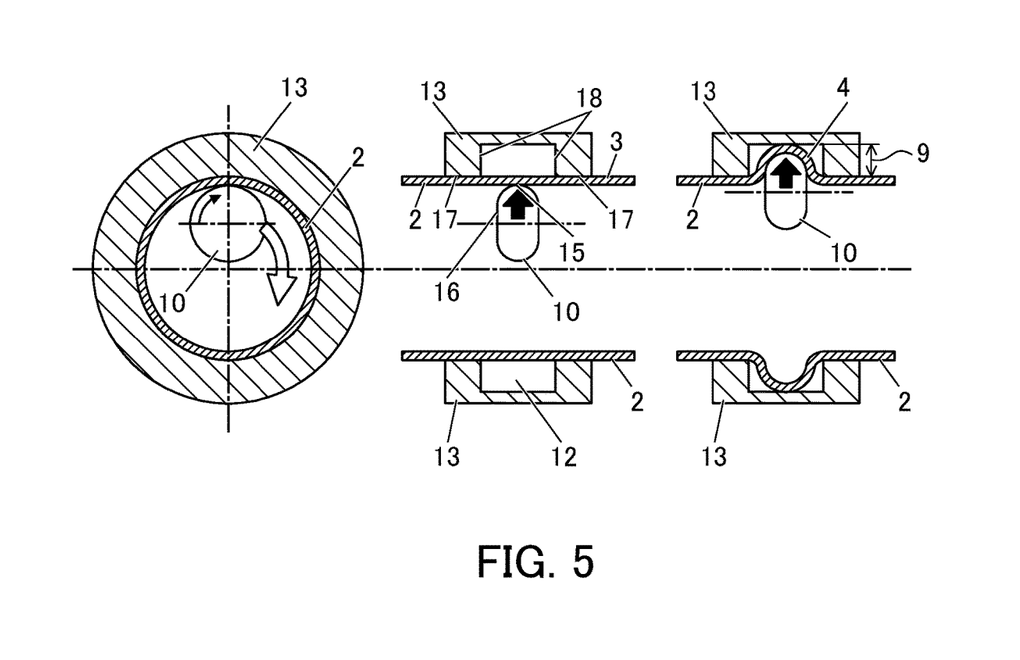
FIG. 5 is a diagram illustrating a method of forming the locking ridge by using a ring having the convex roller and the forming circular groove, regarding the form rolling method of the present invention.

Yet alternatively, as illustrated in FIG. 5, the locking ridge 4 can be formed by form rolling by attaching a ring 13 having the forming circular groove to the outer peripheral surface 3 of the workpiece pipe body 2 instead of the concave roller on the outside, and rotating the convex roller 10 on the inside along a circumferential direction of the pipe body while operating in a direction of approaching each other.

In other words, the locking ridge is formed by a combination of the forming circular groove arranged outside the pipe body and the convex roller arranged inside the pipe body.

It is preferable to perform the form rolling while applying pressure in the pipe axis direction upon formation of the locking ridge on the pipe body.

As illustrated in FIGS. 1 and 2, it is preferable to use the convex roller 10 on the inside having a curve of a curvature radius $R_I$ at a contact portion between the tip surface 15 thereof and the upright wall surface 16.

It is preferable to use the forming circular groove 12 having a curve of a curvature radius $R_U$ at a contact portion between the tip surface 17 thereof and the inner upright wall surface 18.

Effects of the Invention

The form rolling method of the present invention can apply a high degree of work and can form a locking ridge having great hardness. As a result, even if a great tensile load is applied to the joint portion of the fluid supply pipe, the locking ridge can be prevented from deforming and the detachment prevention performance of the pipe can be improved.

Figure 7:
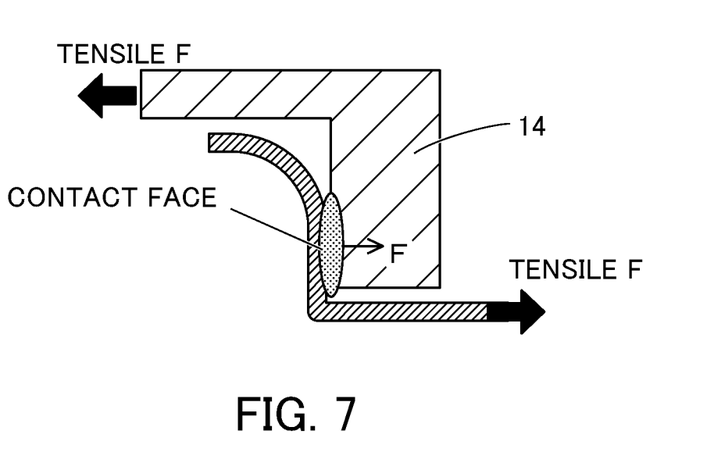
FIG. 7 is a diagram illustrating a detachment prevention effect of a joint portion employing the locking ridge formed according to the form rolling method of the present invention.

In addition, in the case of pipes with the locking ridges according to the present invention being connected by fixing pipe ends with a housing, the locking ridge deforms appropriately when a tensile load is applied in the pipe axis direction, to thereby provide a joint portion structure as illustrated in FIG. 7 in which the upright wall surface of the locking ridge formed on the fluid supply pipe and the inner wall surface of the housing are in surface contact. Consequently, an area of contact between the locking ridge and the housing increases and a load applied per unit area decreases. Furthermore, even if a tensile force acts in the pipe axis direction, a proportion of a downward component force is reduced. As a result, the detachment prevention performance from the housing can be improved. In particular, the locking ridge having the upright wall portion raised vertically at an angle of 90° has a large area of surface contact and does not generate the downward component force, and therefore provides a joint portion superior in detachment prevention performance.

In addition, the form rolling method of the present invention can adjust the angle of the upright wall portion by moving the forming circular groove in the pipe axis direction, and can provide the locking ridge having a preferable contact state with the housing.

Furthermore, in the fluid supply pipe according to the present invention, the upright wall portion of the locking ridge is raised at an angle of at least 65° and no greater than 90° with respect to the outer peripheral surface of the pipe body and has at least 1.2 times hardness of a material of the pipe body. As a result, a surface contact state is obtained with respect to the tensile load in the pipe axis direction, to thereby decrease likelihood of deformation and provide superior detachment prevention performance.

PREFERRED MODE FOR CARRYING OUT THE INVENTION

The present inventors etc. have conducted extensive research on ways to improve detachment prevention performance of a joint portion in a case of using pipe bodies having locking ridges, which are formed by the form rolling method disclosed in Patent Document 1, on outer peripheral surfaces with a joint portion in which a housing fixes pipe ends as a fluid supply pipe.

During which they have achieved the present invention.

Details thereof will be described hereinafter, including study processes.

A detachment prevention force at a joint portion, i.e. tensile strength F in the pipe axis direction (kN)≥nominal diameter×3 is required as a part of earthquake resistant performance of a joint portion ("Chika Maisetsu Kanro Taishin Tsugite no Gijutu Kijun (An) (Technical Standard for Earthquake Resistant Joint of Buried Pipelines (Draft))", Japan Institute of Country-ology and Engineering, 1977). For example, in the case of a steel pipe of nominal diameter 80 (90 mm in outer diameter and 3 mm in plate thickness), a tensile strength in the pipe axis direction of at least 240 kN is required.

Given the above, the present invention supposed that it would be possible to improve the detachment prevention performance by changing a contact state between the housing and the locking ridge illustrated in FIG. 9 from line contact to surface contact.

First, a form rolling method of a locking ridge having a vertical upright wall surface raised at an angle of 90° with respect to the outer peripheral surface of the pipe body, as illustrated in FIG. 6(a), was reviewed.

When a tensile load in the pipe axis direction is applied to a joint portion for ends of the pipe bodies having locking ridges, of which cross-sectional shape has the upright wall surface, being covered by a housing for fixing, the contact relationship between the housing and the locking ridge is surface contact state, thereby lowering surface pressure, suppressing deformation of the locking ridge, and making the tensile load act only in the pipe axis direction, as illustrated in FIG. 7. As a result, it is expected that superior fastening performance is exerted on the pipe bodies, and the detachment prevention performance is thus improved.

Based on such idea, a method for forming the locking ridge of which cross-sectional shape has the upright wall surface on the outer peripheral surface of the pipe body was reviewed.

Formation of the locking ridge by the form rolling method is realized by rotating in a circumferential direction of a workpiece pipe body 2 while pressurizing in directions of approaching each other a convex roller 10 arranged inside the workpiece pipe body 2 and a forming circular groove 12 arranged outside the workpiece pipe body 2, as illustrated in FIG. 1.

As illustrated in FIG. 2, with an inner width of the forming circular groove 12 being WU and a width of the convex roller 10 being WI, if a clearance therebetween ((WU−WI)/2) is smaller than an initial plate thickness of the workpiece pipe body 2, the workpiece pipe body 2 is compressed between the rollers and deforms. As a result, the vertical upright wall portion 6 raised at an angle of 90° with respect to the outer peripheral surface 3 of the pipe body is formed at a site of the deformation. In order to form the upright wall portion 6, a convex height 9 must be at least equal to a total of RI at a contact portion between a tip surface 15 and the upright wall surface 16 of the convex roller 10 and RU at a contact portion between a tip surface 17 of the forming circular groove 12 of the concave roller 11 and an inner upright wall surface 18.

After the compression processing, a high degree of work was applied to and work-hardening was caused at the site of the deformation, and therefore the locking ridge thus processed had great hardness and a characteristic of suppressing deformation under a tensile load. However, in the case of the convex height being too large, a proportion of decrease in plate thickness becomes too large and the plate thickness is reduced, and the deformation resistance against the tensile load tends to be reduced.

Next, a case of manufacturing with the clearance at least equal to the plate thickness was reviewed. In this case, the upright wall portion which is inclined with respect to the pipe axis direction of the workpiece pipe body is formed. For making the upright wall portion into a vertical shape at an angle of 90°, a method of forming the locking ridge while applying pressure in the pipe axis direction is effective. A vertical upright wall portion can be formed by, for example, first forming a convex portion (overhanging portion) 4' by form rolling as illustrated in FIG. 3, followed by shaping the convex portion 4' such that the angle 19 of the upright wall portion 6 increases by moving the forming circular groove 12 in the pipe axis direction and pressing the convex portion 4' against the convex roller 10 as illustrated in FIG. 4.

Since processing of pressing against the convex roller applies a high degree of work to and work-hardening is caused at a shaped site, the locking ridge thus processed had great hardness and a superior characteristic of preventing detachment of the pipe under a tensile load.

Such a characteristic is not limited to the locking ridge with the upright wall portion made to be vertical. Even in a case with the upright wall portion shaped with an angle smaller than 90°, the locking ridge had great hardness and a superior characteristic of preventing detachment of the pipe under a tensile load. More specifically, the locking ridge having the upright wall portion shaped with an angle of at least 65° was preferable.

Even the locking ridge having the upright wall portion extending at an angle smaller than 90°, when a tensile load is applied to the joint portion provided with such a locking ridge, deforms at a site of contact with the housing and a surface contact state with an inner wall of the housing is obtained, thereby lowering surface pressure and providing superior detachment prevention performance.

The convex height 9 of the convex portion must be at least equal to a total of RI and RU. However, in the case of the convex height being too large, a proportion of decrease in plate thickness becomes too large and the plate thickness is reduced, and the deformation resistance against the tensile load tends to be reduced.

As a material for the pipe body, a steel pipe is preferably used. Supposing use as a water supplying pipe, a steel pipe of high durability is preferred. As the steel pipe of high durability, a plated steel pipe that is superior in corrosion resistance is preferable. As the plated steel pipe, a steel pipe with Zn—Al—Mg alloy plating that is superior in corrosion resistance is preferable. If further improvement in corrosion resistance is sought, it is preferable to use a steel pipe made of stainless steel such as SUS304.

By using such a steel pipe having a plate thickness of approx. 3 mm, a joint portion satisfying the abovementioned earthquake resistant performance of the joint portion can be obtained.

The present invention can also be applied to a fluid supply pipe used for supply of fluid such as liquid, gas, etc. The present invention can be applied to any joint portion of pipes of which ends are fixedly connected by a housing, and is preferably applied to a joint portion of a water supply pipe.

The present invention is described more in detail hereafter by means of Examples; however, the present invention is not limited thereto.

EXAMPLES

Manufacturing Example 1

Using a SUS304 steel pipe of nominal diameter 80 (90 mm in outer diameter and 3 mm in plate thickness) as a pipe body material, a locking ridge was formed on an outer peripheral surface.

In a case of processing under a condition that a clearance between the inner convex roller and the outer concave roller is smaller than a plate thickness (3 mm) of the pipe body, a form rolling roller having a dimension of 80 mm in outer diameter, 5.0 mm in WI, and 2.5 mm in RI was used as the convex roller 10 illustrated in FIG. 2 and a form rolling roller having a dimension of 117 mm in outer diameter, 17 mm in groove depth, 9.0 mm in WU, and 2.5 mm in RU was used as the concave roller 11. The clearance therebetween was 2.0 mm and smaller than the plate thickness. Under such a condition, a locking ridge of which convex height 9 was approx. 3.5 to 12.0 mm was formed.

In a case of processing under a condition that a clearance between the inner convex roller and the forming circular groove of the outer concave roller is greater than a plate thickness of the pipe body, a form rolling roller having a dimension of 80 mm in outer diameter, 5.0 mm in WI, and 2.5 mm in RI was used as the convex roller 10 illustrated in FIG. 3 and a form rolling roller having a dimension of 117 mm in outer diameter, 17 mm in groove depth, 13.0 mm in WU, and 2.5 mm in RU was used as the concave roller 11. The form rolling was further performed while applying pressure in a pipe axis direction of the pipe body. The clearance therebetween was 4.0 mm and greater than the plate thickness.

Under such a condition, locking ridges of which convex height was: approx. 4.0 mm, which is smaller than a total of RI at a tip of the convex roller and RU at a contact portion between a tip of the forming circular groove of the concave roller and an inner upright wall surface; approx. 6.0 mm; approx. 12.0 mm; and approx. 15.0 mm, which are greater than the total of RI and RU, were formed.

Manufacturing Example 2

Using a SUS304 steel pipe of nominal diameter 150 (165 mm in outer diameter and 3.5 mm in plate thickness) as a pipe body material, a locking ridge was formed on an outer peripheral surface.

In a case of processing under a condition that a clearance between the inner convex roller and the outer concave roller is smaller than a plate thickness (3.5 mm) of the pipe body, a form rolling roller having a dimension of 110 mm in outer diameter, 6.0 mm in WI, and 3.0 mm in RI was used as the convex roller and a form rolling roller having a dimension of 117 mm in outer diameter, 17 mm in groove depth, 10.0 mm in WU, and 2.5 mm in RU was used as the concave roller. The clearance therebetween was 2.0 mm. Under such a condition, a locking ridge of which convex height was approx. 4.0 to 18.0 mm was formed.

In a case of processing under a condition that a clearance between the inner convex roller and the outer concave roller is greater than the plate thickness of the pipe body, a form rolling roller having a dimension of 110 mm in outer diameter, 6.0 mm in WI, and 3.0 mm in RI was used as the convex roller and a form rolling roller having a dimension of 117 mm in outer diameter, 17 mm in groove depth, 18.0 mm in WU, and 2.5 mm in RU was used as the concave roller. The form rolling was further performed while applying pressure in a pipe axis direction of the pipe body. The clearance therebetween was 6.0 mm and greater than the plate thickness.

Under such a condition, locking ridges of which convex height was: approx. 4.0 mm, which is smaller than a total of RI of the convex roller and RU of the forming circular groove of the concave roller (5.5 mm); and approx. 8.0 mm, which is greater than the total.

Manufacturing Example 3

Using a SUS304 steel pipe of nominal diameter 250 (267 mm in outer diameter and 4.0 mm in plate thickness) as a pipe body material, a locking ridge was formed on an outer peripheral surface.

In a case of processing under a condition that a clearance between the inner convex roller and the outer concave roller is smaller than a plate thickness (4.0 mm) of the pipe body, a form rolling roller having a dimension of 110 mm in outer diameter, 6.0 mm in WI, and 3.0 mm in RI was used as the convex roller and a form rolling roller having a dimension of 117 mm in outer diameter, 17 mm in groove depth, 10.0 mm in WU, and 2.5 mm in RU was used as the concave roller. The clearance therebetween was 2.0 mm. Under such a condition, a locking ridge of which convex height was approx. 4.0 to 20.0 mm was formed.

In a case of processing under a condition that a clearance between the inner convex roller and the outer concave roller is greater than the plate thickness of the pipe body, a form rolling roller having a dimension of 110 mm in outer diameter, 6.0 mm in WI, and 3.0 mm in RI was used as the convex roller and a form rolling roller having a dimension of 117 mm in outer diameter, 17 mm in groove depth, 20.0 mm in WU, and 2.5 mm in RU was used as the concave roller. The form rolling was further performed while applying pressure in a pipe axis direction of the pipe body. The clearance therebetween was 7.0 mm and greater than the plate thickness.

Under such a condition, a locking ridge of which convex height was approx. 9.0 mm, which is greater than the total of RI of the convex roller and RU of the forming circular groove of the concave roller (5.5 mm) were formed.

<Evaluation 1> Cross-Sectional Observation

The form-rolled portion of the stainless steel pipe thus formed was cut along a longitudinal direction of the workpiece pipe body and a cross-section thereof was observed. A minimum plate thickness of the basal portion and a length of the upright wall portion of the locking ridge were measured. The cross-section thus cut was embedded in resin, a surface was polished, and measured with a length measuring microscope. In addition, an angle at which the upright wall portion of the locking ridge was raised from the outer peripheral surface of the pipe body was measured. A cross-sectional shape was measured with a laser displacement meter, and an angle of an intersection between a baseline extending from the outer peripheral surface and a straight line extending from an outer surface of the convex portion was calculated.

In a case of form rolling under a condition that a clearance between the convex roller and the forming circular groove is smaller than a plate thickness, the locking ridges obtained in Manufacturing Examples 1 to 3 had cross-sectional shape including a curved basal portion extending from the outer peripheral surface of the pipe body, an upright wall portion extending vertically at an angle of 90° with respect to the outer peripheral surface in the pipe axis direction, a curved portion formed continuously therefrom, and a tip portion as illustrated in FIG. 6(a). For example in Test Example 4 having a convex height of approx. 7.0 mm obtained in Manufacturing Example 1, the plate thickness of each portion of the locking ridge has been reduced to approx. 1.8 mm at the basal portion. The reduction rate of plate thickness at the basal portion was approx. 40%.

As described above, by using form rolling rollers with a clearance that is smaller than the plate thickness of the pipe body, a locking ridge having the vertically extending upright wall portion was obtained in such a way that the locking ridge was protruding in an outer diameter direction while the plate thickness at a side wall portion was being reduced by compression processing.

In a case of form rolling under a condition that a clearance between the convex roller and the forming circular groove is greater than the plate thickness of the pipe body, cross-sectional shapes of the locking ridges obtained in Manufacturing Examples 1 to 3 includes the upright wall portion vertically extending at an angle of 90° with respect to the pipe axis direction as illustrated in FIG. 6(a), depending on the convex height. Alternatively, the locking ridge includes an inclined upright wall portion extending at an angle of at least 65° as illustrated in FIG. 6(b).

<Evaluation 2> Tensile Test in Pipe Axis Direction

Using test samples obtained in Manufacturing Examples 1 to 3, a tensile test in the pipe axis direction was conducted to measure the detachment prevention performance of the joint portion. The form-rolled locking ridge was fixed by a housing and measurement was performed with a universal tester under a maximum load. The measurement results are shown in Table 1 (Manufacturing Example 1), Table 2 (Manufacturing Example 2), and Table 3 (Manufacturing Example 3).

As discussed above, the joint portion is required to have tensile strength F (kN)≥nominal diameter×3 in the pipe axis direction. For example, for the joint portion of the pipe body of nominal diameter 80, a standard load of earthquake resistant performance is at least 240 kN, and maximum load must be at least the standard load. The maximum load obtained in the measurement being at least the standard load was considered as pass (○) and the maximum load being smaller than the standard load was considered as fail (x).

<Evaluation 2-1> (in the Case of Clearance Between the Inner Convex Roller and the Outer Concave Roller being Smaller than a Plate Thickness of a Workpiece Pipe Body)

Test samples processed under a condition of clearance between the convex roller and the forming circular groove of the concave roller being approx. 2.0 mm were used in: Test Examples 1 to 6 for Manufacturing Example 1; Test Examples 15 to 19 for Manufacturing Example 2; and Test Examples 23 to 27 Manufacturing Example 3.

For Manufacturing Example 1, Test Examples 2 to 5 exhibited maximum loads of at least the standard load as shown in Table 1. For example, Test Example 3 with a convex height of 6.0 mm exhibited a maximum load of 275 kN. Meanwhile, Test Example 1 with a convex height of 3.5 mm, which was smaller than the total of RI and Ru (5.0 mm), exhibited the smallest maximum load. Test Example 6 with an extremely large convex height had a drastically reduced plate thickness (50%) at the basal portion, and exhibited decreased maximum load.

For Manufacturing Example 2, Test Examples 16 to 18 exhibited maximum loads of at least the standard load as shown in Table 2. Meanwhile, for example Test Example 15 with a convex height of approx. 4.0 mm, which was smaller than the total of RI and Ru (5.5 mm), exhibited the smallest maximum load. Test Example 19 with an extremely large convex height had a drastically reduced plate thickness (54%) at the basal portion, and exhibited decreased maximum load.

For Manufacturing Example 3, Test Examples 24 to 26 exhibited maximum loads of at least the standard load as shown in Table 3. Meanwhile, for example Test Example 23 with a convex height of 4.0 mm, which is smaller than the total of RI and Ru (5.5 mm), exhibited the smallest maximum load. Test Example 27 with an extremely large convex height had a drastically reduced plate thickness (55%) at the basal portion, and exhibited decreased maximum load.

<Evaluation 2-2> (in the Case of Clearance Between the Inner Convex Roller and the Outer Concave Roller being Greater than a Plate Thickness of a Workpiece Pipe Body)

As shown in Table 1, test samples processed under a condition of the clearance being approx. 4.0 mm in Manufacturing Example 1 were used in Test Examples 7 to 14. Among these, Test Example 7 with a convex height smaller than the total of RI and Ru (5.0 mm) exhibited a maximum load of 230 kN, which was smaller than the standard load. Among Test Examples with a convex height being at least equal to the total, Test Examples 9, 10, 12 and 13 of which upright wall portions were at 70° and 90° with respect to the pipe axis direction exhibited maximum loads of at least the standard load. For example, Test Example 13 (convex height of approx. 12.0 mm and angle of 90°) exhibited 255 kN. Meanwhile, Test Examples 8 and 11 having an angle of 60° exhibited maximum loads smaller than the standard load. Test Example 14 with an extremely large convex height had a drastically reduced plate thickness (50%) at the basal portion, and exhibited decreased maximum load.

As shown in Table 2, test samples processed under a condition of the clearance being approx. 6.0 mm in Manufacturing Example 2 were used in Test Examples 20 to 22. The convex heights were 8.0 mm, which was greater than the total of RI and Ru (5.5 mm), and Test Examples 21 and 22 of which upright wall portions were at 70° and 90° with respect to the pipe axis direction exhibited maximum loads of at least the standard load. Meanwhile, Test Example 20 having an angle of 60° exhibited maximum loads smaller than the standard load.

As shown in Table 3, test samples processed under a condition of the clearance being approx. 7.0 mm in Manufacturing Example 3 were used in Test Examples 28 to 30. The convex heights were 9.0 mm, which was greater than the total of RI and Ru (5.5 mm), and Test Examples 29 and 30 of which upright wall portions were at 70° and 90° with respect to the pipe axis direction exhibited maximum loads of at least the standard load. Meanwhile, Test Example 28 having an angle of 60° exhibited maximum loads smaller than the standard load.

<Evaluation 3> (Hardness Test)

Figure 8:
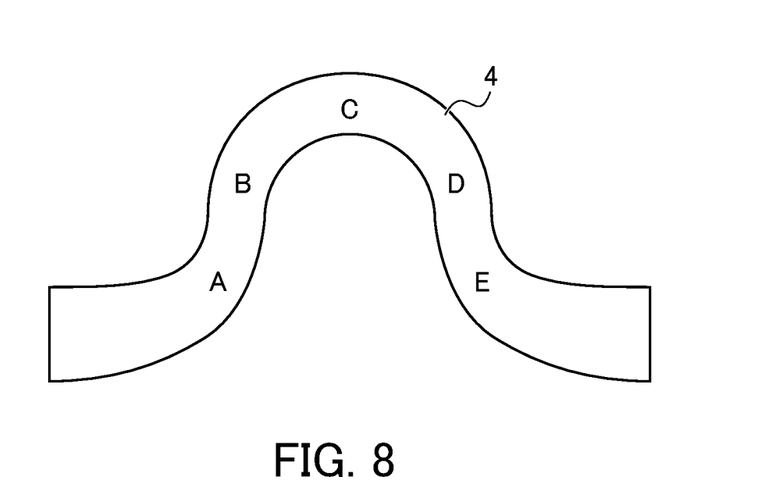
FIG. 8 is a diagram illustrating a measured position in a hardness test in Example of the present invention.

Using a test piece with a locking ridge, hardness at the basal portion, the upright wall portion, and the tip portion was measured. The test piece being cut was embedded in resin, a cross-section was polished, and hardness was measured by a micro Vickers hardness test. Hardness of the pipe body material was 152 HV. The measurement results are shown in Tables 1 to 3. As illustrated in FIG. 8, Positions A and E show results of measurement in the basal portion; Positions B and D show results of measurement in the upright wall portion; and Position C shows results of measurement in the tip portion.

In Manufacturing Examples 1 to 3, Test Examples having the maximum load of at least the standard load exhibited high hardness of at least 300 HV, as shown in Tables 1 to 3. The hardness was more than approx. twice as high as the hardness of the pipe body material. Meanwhile, Test Examples having a maximum load smaller than the standard load exhibited low hardness of no greater than approx. 230 HV. Test Examples obtained by the method of the present invention had increased hardness, as a result of the compression processing during formation of the convex portion applying a high degree of work and realizing work-hardening. Consequently, deformation of the locking ridge due to the tensile load was suppressed, thereby increasing the maximum load of the test piece.

Given the above results, it has been proven that the joint portion manufactured by the form rolling method of the present invention has high maximum load, suppresses deformation of the locking ridge, and has superior pipe detachment prevention performance. It has been confirmed that the most of the tensile load acts in the pipe axis direction and superior engaging performance between pipe bodies can be exerted. Especially the locking ridge having the upright wall portion vertically extending at 90° with respect to the pipe axis direction and in surface contact with the housing had low surface pressure and could suppress deformation of the locking ridge.

TABLE 1

Test Results for Test Samples Obtained in Manufacturing Example 1 (Pipe Body of Nominal Diameter 80)

| Nominal Diameter (mm) | Clearance (mm) | Convex Height (mm) | Upright Wall Portion Angle (°) | Hardness (HV) (Material: 152 HV) | | | | | Max. Load (kN) |
|---|---|---|---|---|---|---|---|---|---|
| | | | | Position A | Position B | Position C | Position D | Position E | |
| 80 | 2.0 | 3.5 | — | — | — | — | — | — | 225 |
| (Φ90 × | | 5.0 | 90 | — | — | — | — | — | 255 |
| t3.0) | | 6.0 | | 328 | 385 | 352 | 394 | 335 | 275 |
| | | 7.0 | | — | — | — | — | — | 260 |
| | | 10.0 | | — | — | — | — | — | 245 |
| | | 12.0 | | — | — | — | — | — | 230 |
| | 4.0 | 4.0 | 90 | — | — | — | — | — | 230 |
| | | 6.0 | 60 | 210 | 208 | 224 | 205 | 226 | 225 |
| | | | 70 | — | — | — | — | — | 240 |
| | | | 90 | 386 | 354 | 312 | 364 | 397 | 285 |
| | | 12.0 | 60 | — | — | — | — | — | 235 |
| | | | 70 | — | — | — | — | — | 245 |
| | | | 90 | 384 | 362 | 310 | 355 | 391 | 255 |
| | | 15.0 | 90 | — | — | — | — | — | 225 |

| Nominal Diameter (mm) | Clearance (mm) | Convex Height (mm) | Determination (Standard Load) 240 kN | Test Example No. | Basal Portion Min. Plate Thickness (mm) | Basal Portion Plate Thickness Reduction Rate (%) | Vertical Upright Wall Length (mm) |
|---|---|---|---|---|---|---|---|
| 80 | 2.0 | 3.5 | x | 1 | 2.8 | 7 | 0 |
| (Φ90 × | | 5.0 | ○ | 2 | 2.3 | 23 | 1.5 |
| t3.0) | | 6.0 | ○ | 3 | 2.1 | 30 | 2.5 |
| | | 7.0 | ○ | 4 | 1.8 | 40 | 3.5 |
| | | 10.0 | ○ | 5 | 1.6 | 47 | 6.5 |
| | | 12.0 | x | 6 | 1.5 | 50 | 8.5 |
| | 4.0 | 4.0 | x | 7 | 2.7 | 10 | 0.5 |
| | | 6.0 | x | 8 | 2.3 | 23 | — |
| | | | ○ | 9 | 2.2 | 27 | — |
| | | | ○ | 10 | 2.2 | 27 | 2.5 |
| | | 12.0 | x | 11 | 1.8 | 40 | — |
| | | | ○ | 12 | 1.6 | 47 | — |
| | | | ○ | 13 | 1.6 | 47 | 8.5 |
| | | 15.0 | x | 14 | 1.5 | 50 | 11.5 |

TABLE 2

Test Results for Test Samples Obtained in Manufacturing Example 2 (Pipe Body of Nominal Diameter 150)

| Nominal Diameter (mm) | Clearance (mm) | Convex Height (mm) | Angle (°) | Hardness (HV) (Material: 152 HV) | | | | | Max. Load (kN) |
|---|---|---|---|---|---|---|---|---|---|
| | | | | Position A | Position B | Position C | Position D | Position E | |
| 150 (Φ165 × t3.5) | 2.0 | 4.0 | 90 | — | — | — | — | — | 430 |
| | | 6.0 | | — | — | — | — | — | 490 |
| | | 8.0 | | 328 | 412 | 366 | 401 | 331 | 540 |
| | | 10.0 | | — | — | — | — | — | 520 |
| | | 18.0 | | — | — | — | — | — | 445 |
| | 6.0 | 8.0 | 60 | 209 | 199 | 212 | 200 | 211 | 430 |
| | | | 70 | — | — | — | — | — | 520 |
| | | | 90 | 388 | 365 | 314 | 372 | 391 | 555 |

| Nominal Diameter (mm) | Clearance (mm) | Convex Height (mm) | Determination (Standard Load) 450 kN | Test Example No. | Basal Portion Min. Plate Thickness (mm) | Basal Portion Plate Thickness Reduction Rate (%) | Vertical Upright Wall Length (mm) |
|---|---|---|---|---|---|---|---|
| 150 (Φ165 × t3.5) | 2.0 | 4.0 | x | 15 | 3.2 | 9 | 0.4 |
| | | 6.0 | ○ | 16 | 2.7 | 23 | 2.4 |
| | | 8.0 | ○ | 17 | 2.3 | 34 | 4.4 |
| | | 10.0 | ○ | 18 | 2.1 | 40 | 6.4 |
| | | 18.0 | x | 19 | 1.6 | 54 | 14.4 |
| | 6.0 | 8.0 | x | 20 | 2.7 | 23 | — |
| | | | ○ | 21 | 2.6 | 26 | — |
| | | | ○ | 22 | 2.5 | 29 | 4.4 |

TABLE 3

Test Results for Test Samples Obtained in Manufacturing Example 3 (Pipe Body of Nominal Diameter 250)

| Nominal Diameter (mm) | Clearance (mm) | Convex Height (mm) | Angle (°) | Hardness (HV) (Material: 152 HV) | | | | | Max. Load (kN) |
|---|---|---|---|---|---|---|---|---|---|
| | | | | Position A | Position B | Position C | Position D | Position E | |
| 250 (Φ267 × t4.0) | 2.0 | 4.0 | 90 | — | — | — | — | — | 710 |
| | | 6.0 | | — | — | — | — | — | 760 |
| | | 9.0 | | 335 | 399 | 361 | 411 | 341 | 910 |
| | | 15.0 | | — | — | — | — | — | 770 |
| | | 20.0 | | — | — | — | — | — | 700 |
| | 7.0 | 9.0 | 60 | 215 | 201 | 220 | 198 | 230 | 720 |
| | | | 70 | — | — | — | — | — | 900 |
| | | | 90 | 390 | 371 | 318 | 369 | 401 | 935 |

| Nominal Diameter (mm) | Clearance (mm) | Convex Height (mm) | Determination (Standard Load) 750 kN | Test Example No. | Basal Portion Min. Plate Thickness (mm) | Basal Portion Plate Thickness Reduction Rate (%) | Vertical Upright Wall Length (mm) |
|---|---|---|---|---|---|---|---|
| 250 (Φ267 × t4.0) | 2.0 | 4.0 | x | 23 | 3.6 | 10 | 0.7 |
| | | 6.0 | ○ | 24 | 3.2 | 20 | 2.7 |
| | | 9.0 | ○ | 25 | 2.6 | 35 | 5.7 |
| | | 15.0 | ○ | 26 | 2.4 | 40 | 11.7 |
| | | 20.0 | x | 27 | 1.8 | 55 | 16.7 |
| | 7.0 | 9.0 | x | 28 | 2.9 | 28 | — |
| | | | ○ | 29 | 2.8 | 30 | — |
| | | | ○ | 30 | 2.7 | 33 | 5.7 |

EXPLANATION OF REFERENCE NUMERALS

1 Joint portion
2 Workpiece pipe body
3 Outer peripheral surface
4 Locking ridge
4' Convex portion
5 Basal portion
6 Upright wall portion
7 Curved portion
8 Tip portion
9 Convex height 10 Convex roller
11 Concave roller
12 Forming circular groove
13 Ring
14 Housing
15 Tip surface (Convex roller)
16 Upright wall surface (Convex roller)
17 Tip surface (Forming circular groove)
18 Inner upright wall surface (Forming circular groove)
19a Angle
19b Baseline
19c Straight line
20 Pipe joint
21 Locking ridge
22 Pipe body
23 Housing
24 Inner peripheral opening edge
25 Inner form rolling roller
26 Forming ridge
27 Outer form rolling roller
28 Forming circular groove
29 Circular groove
30 Locking member
31 Welded portion

The invention claimed is:

1. A form rolling method of a joint portion of a fluid supply pipe, the form rolling method forming a locking ridge having an upright wall portion on an outer peripheral surface of a workpiece pipe body, wherein:
the locking ridge includes a curved basal portion extending from the outer peripheral surface, the upright wall portion extending from the basal portion, a curved portion extending from the upright wall portion, and a tip portion extending from the curved portion; and
the form rolling method comprising:
providing processing means comprising a convex roller arranged inside the pipe body and a forming circular groove arranged outside the pipe body, wherein a clearance between the convex roller and the forming circular groove is greater than plate thickness of the pipe body;
processing the pipe body using the processing means to form a convex portion on the outer peripheral surface;
moving the forming circular groove along a direction of longitudinal axis of the pipe to press the convex portion against the convex roller thereby forming the locking ridge, wherein the upright wall portion of the locking ridge is raised at an angle of at least 65° and no greater than 90° with respect to the outer peripheral surface in a direction along longitudinal axis of the pipe, and
a height of the locking ridge from the outer peripheral surface to an apex of the tip portion is at least equal to a total of curvature radii of faces of the processing means arranged inside and outside in contact with the pipe body.

2. The form rolling method for a joint portion of a fluid supply pipe according to claim 1, wherein the convex roller has a curve of a curvature radius $R_I$ at a contact portion between an apical surface thereof and the upright wall surface.

3. The form rolling method for a joint portion of a fluid supply pipe according to claim 1, wherein the forming circular groove has a curve of a curvature radius $R_U$ at a contact portion between a tip surface thereof and an inner upright wall surface.

4. The form rolling method for a joint portion of a fluid supply pipe according to claim 1, wherein the locking ridge is formed while pressure is applied to the pipe body in the pipe axis direction.

* * * * *